Figure 1:
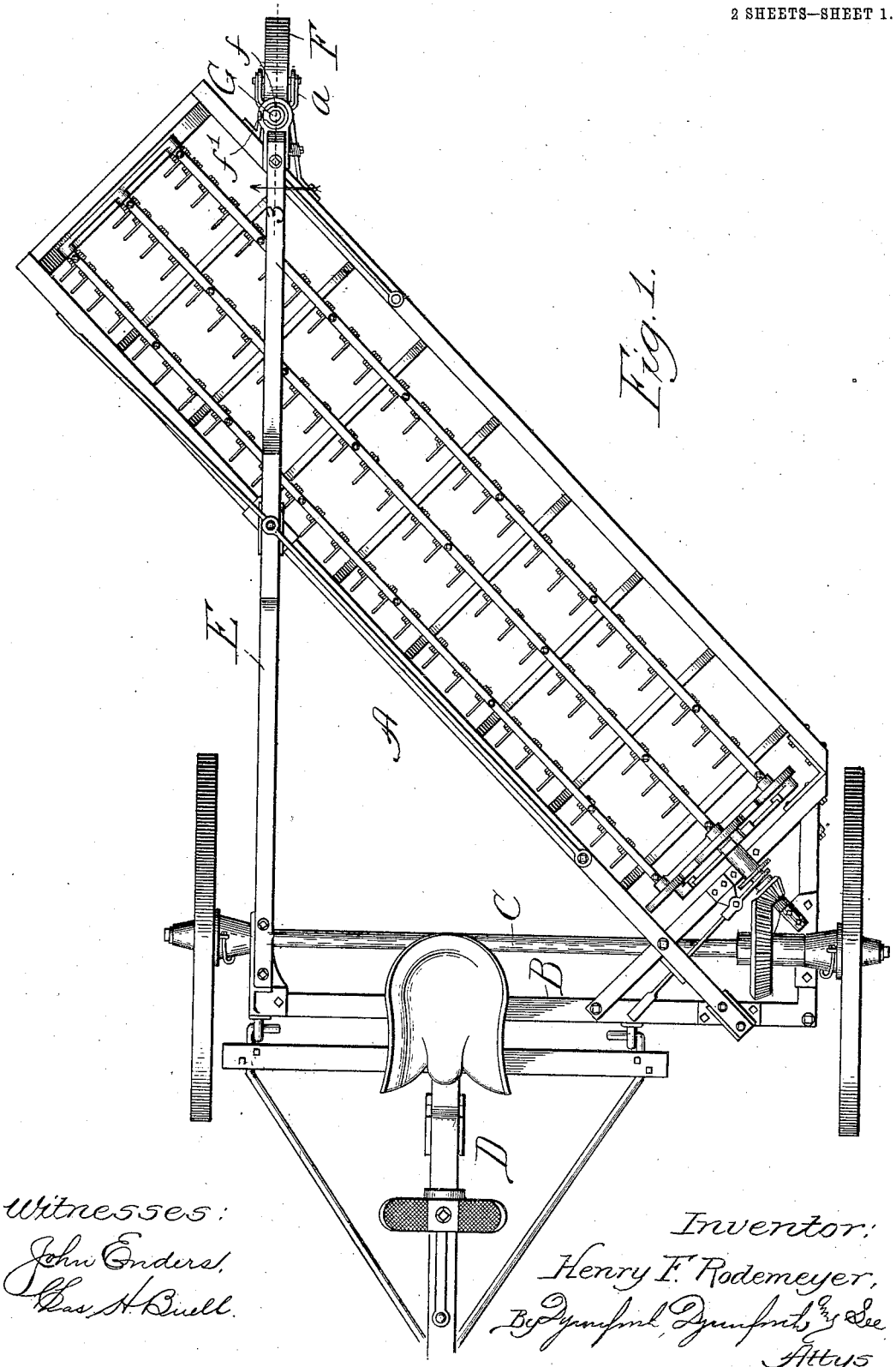

No. 828,571. PATENTED AUG. 14, 1906.
H. F. RODEMEYER.
HAY RAKE.
APPLICATION FILED SEPT. 5, 1905.

2 SHEETS—SHEET 1.

Witnesses:
John Enders
Chas. H. Buell

Inventor:
Henry F. Rodemeyer,
By Dyrenforth, Dyrenforth & Lee
Attys

No. 828,571. PATENTED AUG. 14, 1906.
H. F. RODEMEYER.
HAY RAKE.
APPLICATION FILED SEPT. 5, 1905.
2 SHEETS—SHEET 2.
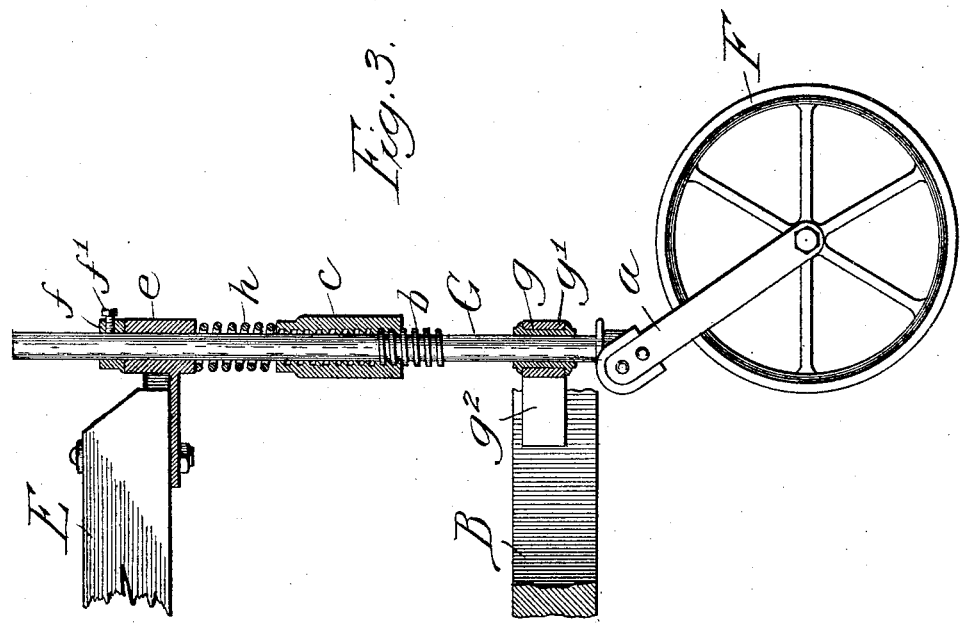
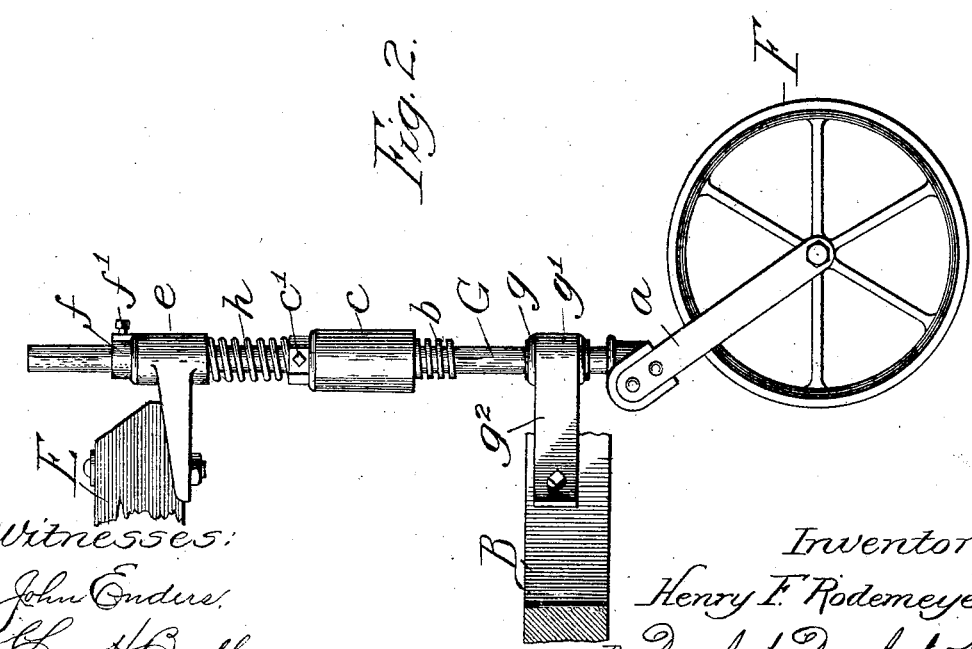
Witnesses:
John Endurs
Chas H Buell
Inventor:
Henry F. Rodemeyer,
By Dyrenforth, Dyrenforth & Lee,
Attys

UNITED STATES PATENT OFFICE.

HENRY F. RODEMEYER, OF STERLING, ILLINOIS, ASSIGNOR TO STERLING MANUFACTURING COMPANY, OF ROCK FALLS, ILLINOIS, A CORPORATION OF ILLINOIS.

HAY-RAKE.

No. 828,571.     Specification of Letters Patent.     Patented Aug. 14, 1906.

Application filed September 5, 1905. Serial No. 276,978.

*To all whom it may concern:*

Be it known that I, HENRY F. RODEMEYER, a citizen of the United States, residing at Sterling, in the county of Whiteside and State of Illinois, have invented a new and useful Improvement in Hay-Rakes, of which the following is a specification.

My invention relates more especially to an improvement in the class of side-delivery hay-rakes wherein the frame which carries the raking mechanism is supported at its outer end on a caster-wheel; and it relates particularly to means for facilitating adjustment of the frame on said support with relation to the ground-surface to raise and lower the rake-teeth.

I have especially devised my improvement for use with the hay-rake forming the subject of United States reissued Letters Patent No. 12,194, dated January 19, 1904, and therefore illustrate it in that particular connection in the accompanying drawings, in which—

Figure 1 is a plan view of a side-delivery hay-rake equipped with my improved frame raising and lowering means; Fig. 2, an enlarged view showing the adjusting means forming my improvement in elevation; and Fig. 3, a view like that presented by Fig. 2, but showing the adjusting means in section, the section being taken at the line 3 on Fig. 1 and viewed in the direction of the arrow.

A denotes the rake-frame, supported at one end on the frame B, carried by the axle C, and with which the draft-rigging D is connected, the rake-frame being supported on a hanger-beam E, mounted at one end on the frame B and adjustably supported at its opposite end on the ground through the medium of my improved means for the purpose of which the following is a description.

F is the supporting-wheel, journaled in the lower end of a yoke $a$, the upper end of which is rigidly fastened to the lower end of a stem G, the wheel with its stem forming a species of caster. On the stem is formed or otherwise provided between its ends a screw-thread $b$, with which coöperates an internally-threaded sleeve or nut $c$, surrounding the stem and secured against rotation when set by a set-screw $c'$. A channeled seat $d$ for the end of the hanger-beam E is bolted to the latter and terminates in a vertical sleeve $e$, through which the stem G passes loosely and which is surmounted by a stop-collar $f$, surrounding the stem and vertically adjustable thereon, being provided with a set-screw $f'$ for securing it in adjusted position. The stem passes toward its lower end loosely through a sleeve $g$, seated in a socket $g'$, having arms $g^2$ projecting from it and by which it is securely fastened to the frame A. Between the sleeves $e$ and $c$ is confined a coiled stiff cushioning-spring $h$, surrounding the stem G and through the medium of which the wheel-supported end of the rake-frame is spring-carried.

To raise the frame A with relation to the ground, the collar $f$ is raised to its desired point on the stem G and there fastened by the set-screw $f'$, when the nut $c$, upon loosening the set-screw, is turned to raise the spring $h$ and with it the sleeve $e$, and with the latter the beam E and frame A, carried by it until stopped by the collar $f$, whereupon the nut is fastened by its set-screw $c'$. To lower the rake-frame, the nut $c$, after loosening it, is turned in the contrary direction and the gravity of the parts carried by it causes the sleeves $e$ and $g$ to follow it along the stem G. When the frame has thus been lowered to the desired position, the nut $c$ is fastened by its set-screw and the collar $f$ is loosened on the stem against the upper end of the cushioning-spring and fastener to confine the latter by the set-screw $f'$.

The construction thus described of my improved adjusting device renders it simple and quickly operative under all conditions with great facility for raising the frame of a side-delivery hay-rake and that of any other agricultural or analogous machine having a frame or part end-supported on a wheel through the medium of a stem extending from the latter and adapted to carry adjustably upon it the members of my improved device connected with the frame or other part to be supported. Hence I desire to be understood as intending my improvement for use in all connections of the kind thus suggested as well as in the particular connection for which I have especially designed it, as aforesaid.

What I claim as new, and desire to secure by Letters Patent, is—

1. In a side-delivery hay-rake, the combination with the hanger-beam and rake-frame supported thereon, of an upper sleeve extending from said beam, a lower sleeve connected with said frame, a wheel having a stem passing through said sleeves and provided between them with a screw-thread, a nut engaging said thread, a spring confined between said nut and upper sleeve, and a stop adjustable on the stem above said upper sleeve, for the purpose set forth.

2. In a side-delivery hay-rake, the combination with the hanger-beam and rake-frame supported thereon, of a seat secured to said beam, and terminating in a sleeve, a socket connected with said frame and containing a sleeve, a wheel having a stem passing through said sleeves and provided between them with a screw-thread, a nut engaging said thread and provided with a set-screw, a spring surrounding the stem between said nut and upper sleeve, and a collar on the stem above said upper sleeve and provided with a set-screw, for the purpose set forth.

HENRY F. RODEMEYER.

In presence of—
  E. C. WINTERS,
  J. H. LANDES.